United States Patent [19]

Memmel

[11] Patent Number: 4,764,061
[45] Date of Patent: Aug. 16, 1988

[54] CLAMPING MECHANISM FOR AN AUTOMOBILE DRILLING MACHINE

[75] Inventor: Lawrence C. Memmel, Mequon, Wis.

[73] Assignee: Super Tool and Mfg. Corporation, Brookfield, Wis.

[21] Appl. No.: 841,885

[22] Filed: Mar. 20, 1986

[51] Int. Cl.[4] .............................................. B23B 47/00
[52] U.S. Cl. .................................. 408/69; 144/249 R; 408/109; 409/225
[58] Field of Search ................. 408/103, 109, 108, 37, 408/46, 39, 42, 46, 51, 52; 409/225, 69; 269/289 R, 303, 309, 289 MR; 144/249 R, 249 A

[56] References Cited

U.S. PATENT DOCUMENTS

| | | | |
|---|---|---|---|
| 838,772 | 12/1906 | Crane | 144/249 R |
| 1,770,542 | 7/1930 | MacLeod | 408/108 |
| 1,958,552 | 5/1934 | Thomas | 77/24 |
| 3,685,915 | 8/1972 | Vierstraete | 408/51 |
| 3,730,635 | 5/1973 | Orendi | 408/46 |
| 4,162,134 | 7/1979 | Kitagawa | 408/42 |
| 4,163,623 | 8/1979 | Kitagawa | 408/46 |
| 4,179,230 | 12/1979 | Kitagawa | 408/46 |
| 4,198,181 | 4/1980 | Smelster | 408/46 |
| 4,215,958 | 8/1980 | Jagers | 408/42 |
| 4,268,196 | 5/1981 | Harrow et al. | 408/103 |

FOREIGN PATENT DOCUMENTS

| | | | |
|---|---|---|---|
| 3793 | 1/1977 | Japan | 269/289 MR |
| 192406 | 10/1984 | Japan | 408/3 |

Primary Examiner—Z. R. Bilinsky
Attorney, Agent, or Firm—Andrus, Sceales, Starke & Sawall

[57] ABSTRACT

An improved clamping mechanism for clamping a workpiece as it is moved through an automatic drilling machine. A workpiece, such as a wide flange beam, is supported and conveyed on a plurality of lower rollers, and a group of upper rollers are moved into clamping engagement with the upper surface of the beam. The ends of each upper roller are journalled within slides which are mounted for vertical movement on the frame of the machine, and a hydraulic cylinder unit is connected to each slide so that operation of the cylinder unit will move the upper roller in a direction toward and away from the beam supported on the lower rollers. A shaft extends parallel to the upper roller and interconnects the slides and gears are mounted on opposite ends of the shaft and are engaged with racks mounted on the frame. Movement of the slides through operation of the cylinder units will correspondingly move the gears relative to the racks to maintain both ends of the upper roll in precise horizontal alignment with the lower rolls.

3 Claims, 1 Drawing Sheet

CLAMPING MECHANISM FOR AN AUTOMOBILE DRILLING MACHINE

BACKGROUND OF THE INVENTION

In the fabrication of structural steel members, such as wide flanged beams, channels and the like, the beams are conveyed through an automatic drilling machine where holes are drilled in the web and flanges of the beam in precise locations. In a conventional drilling machine, the beam is supported on a series of parallel lower rollers with the web of the beam being horizontal and the flanges extending vertically and one of the vertical flanges is positioned along a datum line at the side of the drilling machine. With large size beam, the beam will extend substantially across the drilling machine, while with smaller sized beams, the beam may extend only a fraction of the distance across the machine. In addition, the automatic drilling machine includes a group of upper rollers that are moved downwardly into clamping engagement with the upper edges of the vertical flanges of the beam.

When drilling small size beams, the upper rollers, when brought into clamping engagement with the upper edges of the beam, may tend to tilt or cant due to the fact that the smaller size beam extends only a fraction of the length of the clamping roller. The canting of the upper clamping roller can cause unequal pressure being applied to the beam and can result in improper alignment of the beam in the drilling machine.

SUMMARY OF THE INVENTION

The invention is directed to an improved roller clamping mechanism for clamping a workpiece, such as a wide flange beam, as it is moved through an automatic drilling machine. The beam is supported on a plurality of parallel lower rollers and a series of upper rollers are mounted for vertical movement and can be brought into clamping engagement with the upper surface of the beam.

The ends of each upper roller are journalled within slide blocks that are mounted for vertical movement in guide tracks on the supporting structure of the machine. A hydraulic cylinder unit is connected to each slide block, and through operation of the cylinder units, the slide blocks and upper roller can be moved vertically between an upper inoperative position and a lower clamping position.

Connecting the slide blocks is a shaft that extends parallel to the upper roller and the ends of the shaft carry gears or pinions that are engaged with racks mounted on the supporting structure.

As the upper roller is moved vertically through operation of the cylinder units, the pinions will rotate and move relative to the racks. The engagement of the pinion teeth with the rack teeth at opposite ends of the upper roller will maintain the upper roller in a precise horizontal attitude regardless of the length of the beam that is being moved through the drilling machine.

The apparatus of the invention provides a more precise mechanism for insuring that the beam is uniformly clamped against the lower rollers, thereby insuring that the holes to be drilled by the drilling machine are precisely located.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
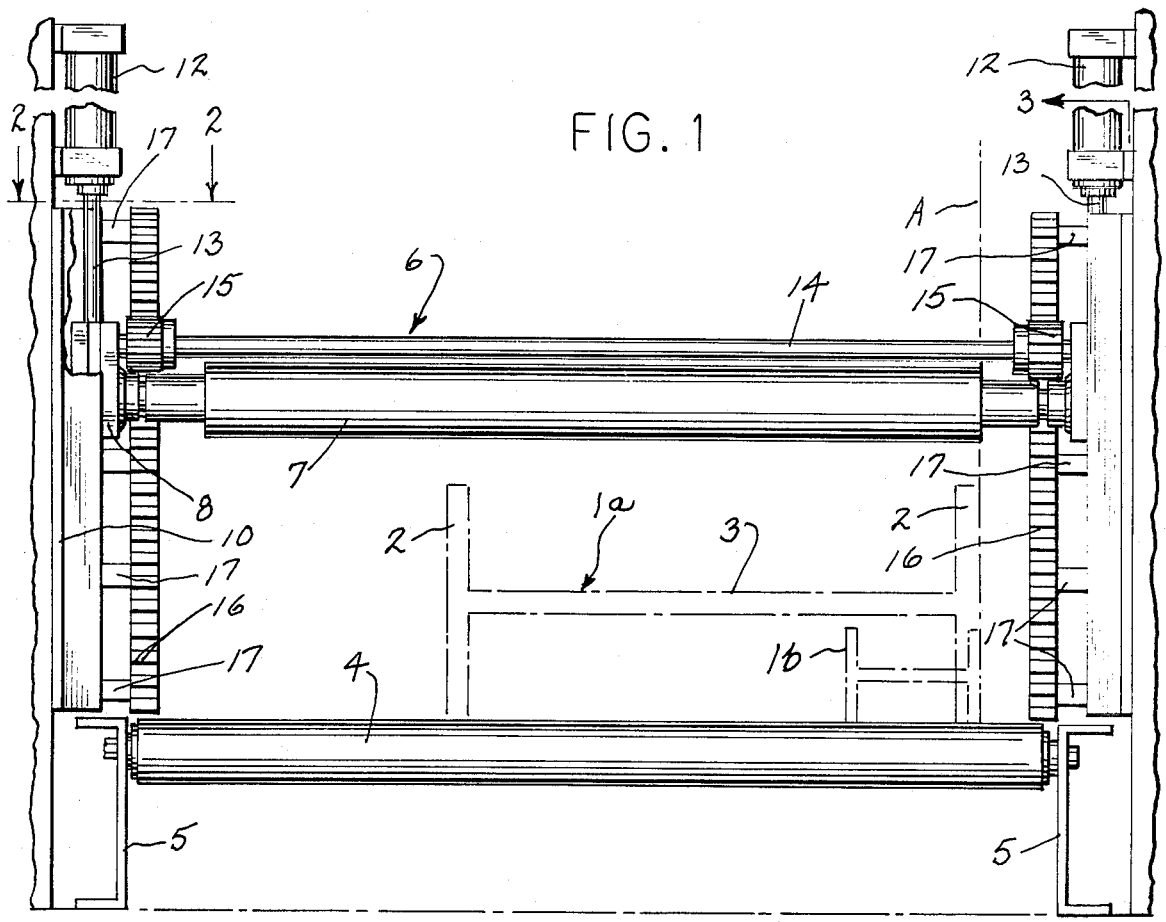
FIG. 1 is a end view of the clamping mechanism.

The drawings illustrate a roller clamping mechanism for clamping a workpiece, such as a wide flange beam 1, as it is moved through an automatic drilling machine. As shown in FIG. 1, beam 1 is composed of a pair of flanges 2 which are connected by a web 3.

While the drawings illustrate the workpiece as a wide flange beam 1 it is contemplated that the workpiece can have other configurations, such as a channel or angle.

As illustrated in FIG. 1, beam 1 can have various sizes, and 1a represents a large size wide flange beam while 1b shows a smaller beam. In both cases however, one of the flanges 2 is aligned with the datum line A of the machine.

The beam 1 is supported and conveyed on a series of generally parallel rollers 4 which are mounted for rotation on channels 5 that are secured to the frame or supporting structure of the drilling machine.

Figure 2:
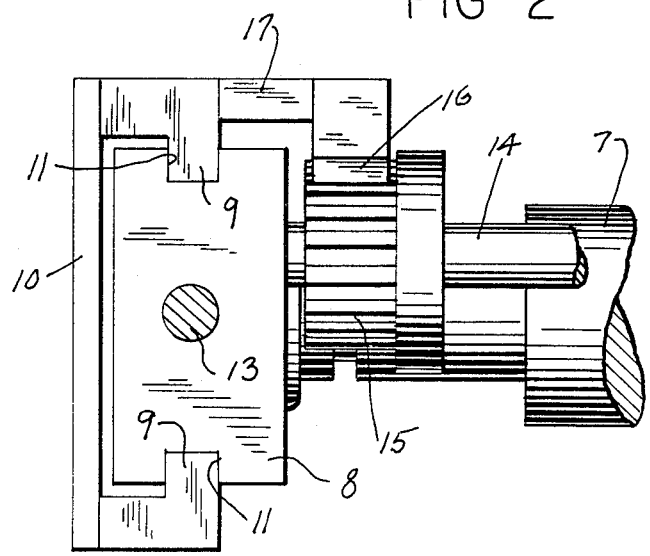
FIG. 2 is a section taken along line 2—2 of FIG. 1.
Figure 3:
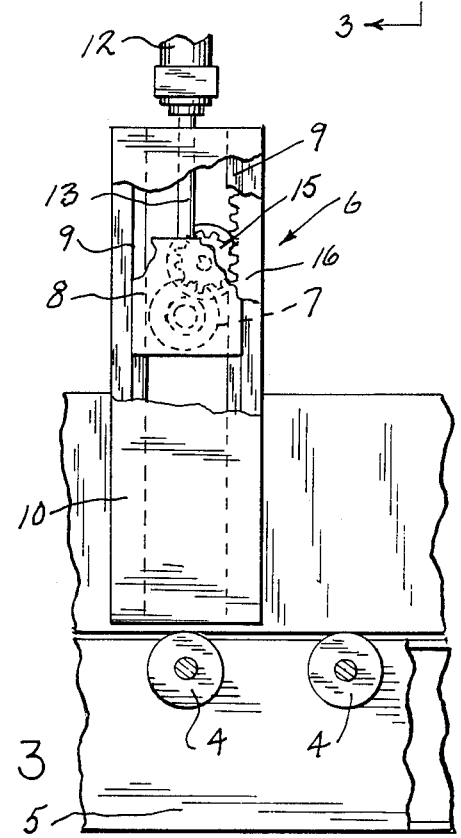
FIG. 3 is section taken along line 3—3 of FIG. 1.

A plurality of upper roller assemblies 6 are adapted to be moved into clamping engagement with the upper edges of flanges 2 of beam 1, and each roller assembly 6 includes a roller 7 that is disposed parallel and above the rollers 4. The ends of each roller 7 are journalled within slide blocks 8 that are mounted for movement on guide rails 9 that are secured to mounting plate 10 attached to the frame of the machine. As shown in FIG. 2, opposed side edges of each side block 8 are provided with grooves 11 which receive the edges of the L-shaped guides 9 to guide the blocks 8 in vertical sliding movement.

Roller 7 is adapted to be moved vertically by a pair of hydraulic cylinder units. Each cylinder unit includes a cylinder 12 which is secured to the frame of the machine and piston rod 13, which is slidable in cylinder 12, is connected to the respective slide block 8. By introducing fluid into the upper end of each cylinder 12, piston rod 13 will be extended to move roller 7 downwardly into engagement with the upper edges of flanges 2 of beam 1. Conversely, by introducing fluid into the lower ends of cylinders 12, piston rods 13 will be retracted to move the roller 7 upwardly out of engagement with beam 1.

In accordance with the invention, a rod or shaft 14 connects the slide blocks 8 and is located above and parallel to roller 7. Mounted on each end of shaft 14 is a gear or pinion 15 and the gears 15 mesh with fixed racks 16 which are mounted through spacers 17 to guide tracks 9.

With this construction, as the slide blocks 8 are moved through operation of the cylinders 12, the gears 15 will rotate with respect to the racks 16 and the engagement of the teeth on gears 15 and racks 16 will maintain the roller 7 in precise horizontal alignment as it is being moved.

When a smaller size beam such as 1b is being moved through the drilling machine, roller 7 would normally tend to tilt or cant as it is brought down into clamping engagement with the upper edges of beam 1b, and the canting action could cause unequal pressure being applied to the beam and a possible misalignment of the beam in the drilling machine. However, with the mechanism of the invention, in which the slides 8 are interconnected by shaft 14, gears 15, and racks 16, roller 7 will be maintained in a horizontal attitude regardless of the size of the beam 1. This insures that the beam will be properly aligned at all times so that the holes will be precisely located and drilled in the web and flanges of the beam.

Various modes of carrying out the invention are contemplated as being within the scope of the following claims particularly pointing out and distinctly claiming the subject matter which is regarded as the invention.

I claim:

1. A clamping mechanism for clamping a metal beam as it is moved through a drilling machine, said beam having a pair of vertical flanges connected by a horizontal web, comprising a lower roller conveyor means to support and convey the beam in a direction of movement, said lower roller conveyor means having a pair of sides and including a plurality of generally parallel lower rollers extending between said sides, one of said flanges being disposed along a predetermined datum line at one of said sides and the other of said flanges being spaced from the other of said sides, upper roller means disposed above said lower roller means and including at least one upper roller to engage the upper edges of said flanges, said upper roller being elongated and disposed generally parallel to said lower rollers and extending continuously across said lower conveyor means from one side to the other side, a slide disposed at each side of said lower conveyor means, guide means for guiding each slide in vertical movement, journalling means for journalling the ends of said upper roller in the respective slides, power operated means connected to each slide for moving each slide vertically in said guide means, a shaft interconnecting the slides, a pair of fixed rack members, a pair of pinion members mounted on said shaft and engaged with the respective rack members, movement of said slides through operation of said power operated means causing movement of said pinion members on said rack members to maintain the ends of said upper roller in parallel alignment with said lower rollers as said upper roller is moved downwardly into clamping engagement with the upper edges of the flanges of said beam.

2. The mechanism of claim 1, wherein said power operated means comprises a fluid cylinder connected to each slide.

3. The mechanism of claim 1, wherein said shaft is located above and parallel to said upper roller.

* * * * *

UNITED STATES PATENT AND TRADEMARK OFFICE
CERTIFICATE OF CORRECTION

PATENT NO. : 4,764,061
DATED : August 16, 1988
INVENTOR(S) : LAWRENCE C. MEMMEL

It is certified that error appears in the above-identified patent and that said Letters Patent is hereby corrected as shown below:

In the Title, Col. Title, Item [54], delete "AUTOMOBILE" and substitute therefor ---AUTOMATIC---; In the Specification, Col. 1, Line 2, delete "AUTOMOBILE" and substitute therefor ---AUTOMATIC---

Signed and Sealed this

Seventeenth Day of October, 1989

Attest:

DONALD J. QUIGG

Attesting Officer

Commissioner of Patents and Trademarks